United States Patent [19]

Hoppmann et al.

[11] 3,986,636

[45] Oct. 19, 1976

[54] HIGH SPEED METHOD FOR TRANSLATING ARTICLES FROM IN-LINE ARRAY TO SIDE BY SIDE ARRAY

[75] Inventors: Kurt H. Hoppmann, Falls Church, Va.; George W. Edmunds, Derwood, Md.; Horst A. Schober, Falls Church, Va.

[73] Assignee: Hoppmann Corporation, Springfield, Va.

[22] Filed: Apr. 17, 1975

[21] Appl. No.: 568,885

[52] U.S. Cl. ................................... 221/7; 198/392; 53/78; 53/246
[51] Int. Cl.² ........................................ B65G 65/30
[58] Field of Search ............. 209/73, 74 R; 198/287; 53/78, 160, 246; 221/7

[56] References Cited
UNITED STATES PATENTS

| | | | |
|---|---|---|---|
| 2,619,869 | 12/1952 | Stewart | 53/246 X |
| 3,018,595 | 1/1962 | Harris et al. | 53/78 |
| 3,139,713 | 7/1964 | Merrill et al. | 53/78 X |
| 3,456,424 | 7/1969 | Thurston et al. | 53/160 X |

Primary Examiner—Robert B. Reeves
Assistant Examiner—Joseph J. Rolla
Attorney, Agent, or Firm—David H. Semmes

[57] ABSTRACT

High speed method for translating particulate articles, such as hollow containers or solid elongated articles from random or in-line array to side by side packaged arrays as a matrix of parallel rows. The articles are advanced upon a horizontal plane, then centrifugally accelerated outwardly at varying radial lengths, according to the desired side by side spacing. The articles are supported at the desired radial length, then dropped into the desired side by side array. Thus, the articles may be first advanced upon a horizontal plane into the inner ends of a series of radially outwardly extending chutes. The chutes are rotated such that centrifugal forces carry the articles to the outer ends of said chutes where they are supported until selectively dropped from the outer ends of the chutes into a side by side array as a matrix of parallel rows. The method is distinguished in its ability to discharge and align the articles in side by side relationship comprising a row of 20 or more articles and is especially adaptable to handling of articles at speeds approaching 2,000 per minute.

15 Claims, 10 Drawing Figures

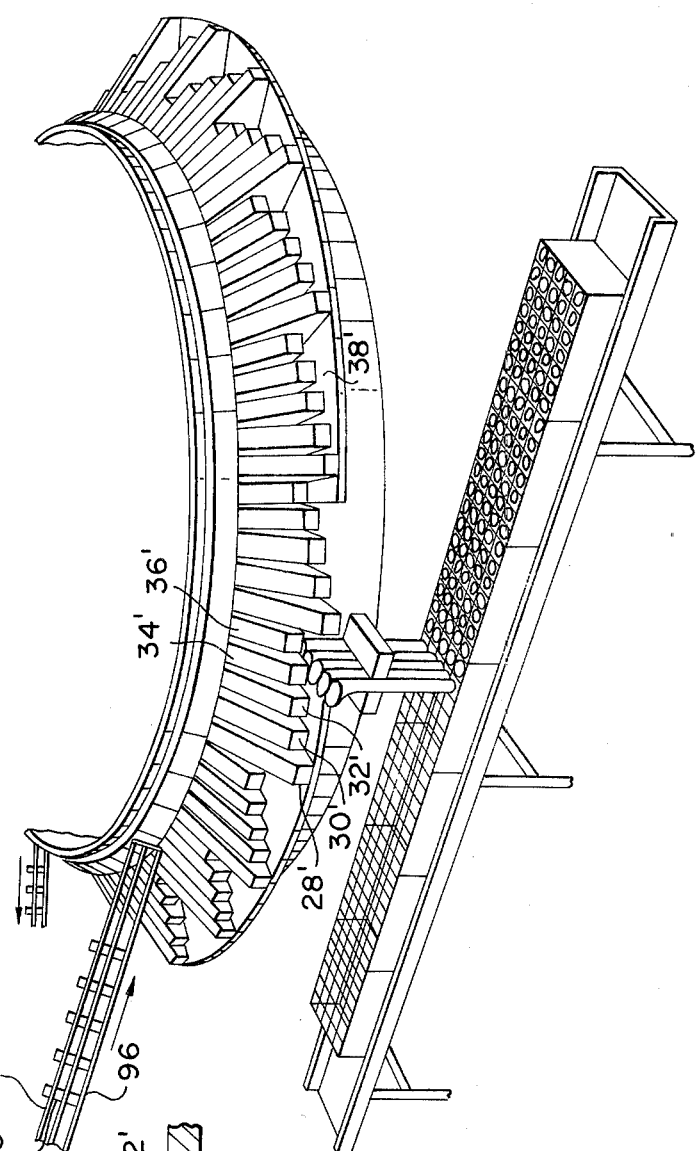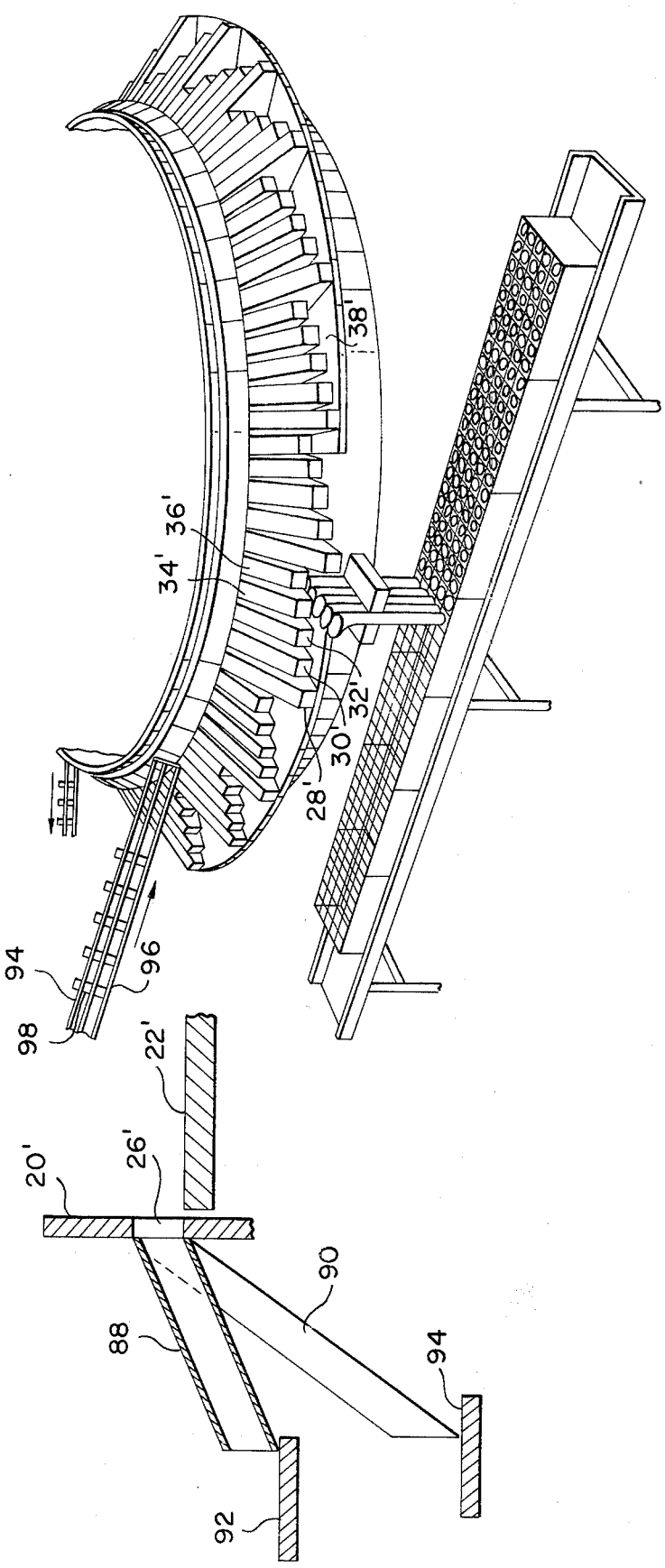

HIGH SPEED METHOD FOR TRANSLATING ARTICLES FROM IN-LINE ARRAY TO SIDE BY SIDE ARRAY

CROSS-REFERENCES TO RELATED APPLICATIONS

The present application is an improvement upon applicants' CENTRIFUGAL METHOD OF SORTING AND ORIENTING PARTICULATE ARTICLES (Ser. 500,835), filed Aug. 26, 1974 and issued as U.S. Pat. No. 3,912,120. In the parent application the articles are accelerated outwardly into a series of radially aligned channels, of various lengths, then dropped in vertically into the desired side by side array. The present application is distinguished in its ability to store a plurality of articles in each channel and to translate the articles from random or single file to side by side array.

BACKGROUND OF THE INVENTION

1. Field of the Invention

A great deal of attention is being given to centrifugally distributing articles to the outer limits of a rotating plane, such that the articles may be placed in single file relationship for counting, packaging, filling, weighing and the like. The single file distribution or alignment of the sorted articles for the most part has severely limited filling or other manufacturing operations. For example, it is desired in the manufacture of shell casings or lip balm of the type designated CHAPSTICK (Registered Trademark Miller-Morton Company, Richmond, Va., 23230) to present a hollow cylindrical container in side by side array as a matrix of parallel rows prior to filling. A multi-headed filling device might simultaneously address a plurality of hollow containers in one or more parallel rows. For example, a rotating wheel type filling device may rotate over a matrix of rows, filling all the containers in a single row at the point of tangential contact. Heretofore, there has not been a successful mode of translating such articles from single file into side by side array. Consequently, the side by side array of containers has for the most part been achieved manually by depositing of the containers in side by side array within a supporting matrix prior to filling.

2. Description of the Prior Art

U.S. Pat. Nos. to:

| | |
|---|---|
| HOAR | 2,632,588 |
| GARRETT | 2,763,108 |
| d'AYTGEVUKKE | 3,063,596 |
| PEARSON | 3,170,627 |
| HURST | 3,215,310 |
| READ | 3,253,604 |
| PEARSON | 3,266,664 |
| HURST | 3,368,713 |
| HOPPMANN, et al. | 3,669,260 |
| HOPPMANN, et al. | 3,722,764 |

SUMMARY OF THE INVENTION

According to the present invention elongated articles, such as CHAPSTICK containers, shells, screws, nails or the like are advanced upon a horizontal plane, thence discharged into an array of outwardly extending, rotating chutes of varying radial lengths. The articles are delivered to the outer ends of the chutes both by centrifugal forces and gravity and supported there prior to discharging or dropping from the outer ends of the chutes into side by side array within matrix parallel rows such as defined in a filling or shipping carton. The chutes are of varying length, such that each chute end is communicative with a side by side pocket in an individual row of the matrix. Modifications of invention include sensing the filled level of containers at a single chute and thereby limiting additional filling, as well as delivering of the articles in superposed matrices of parallel rows.

BRIEF DESCRIPTION OF THE DRAWINGS

FIG. 5 is a fragmentary vertical section of a further modification wherein superposed chutes deliver the articles to superposed matrices;

FIG. 6 is a fragmentary perspective of a modification wherein the articles to be translated are delivered in a single file upon a moving conveyor, such as a chain;

DESCRIPTION OF THE PREFERRED EMBODIMENTS

Figure 1:
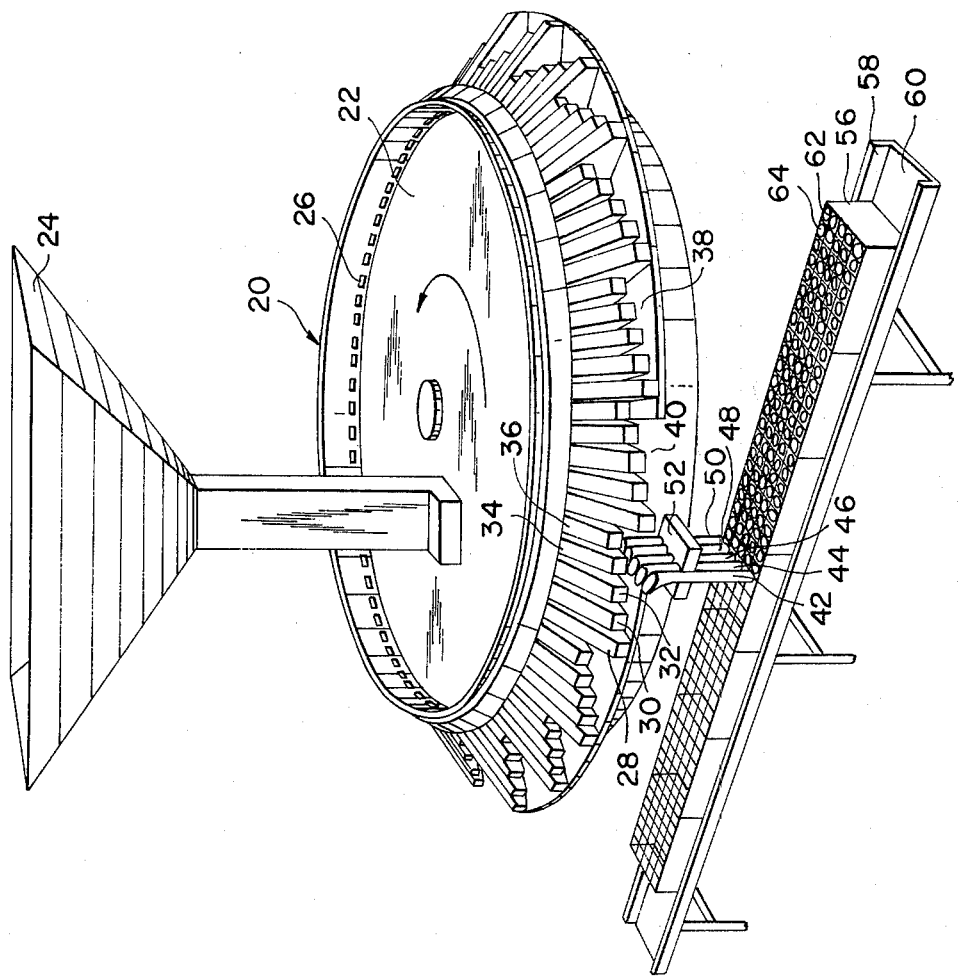
FIG. 1 is a fragmentary perspective of a proposed installation, constructed according to the present inventive method and involving a rotating inner disc, centrifugally distributing the articles into radially extending chutes.

The present method concerns placing of parts into partitioned boxes at a high rate of speed. As illustrated in FIG. 1, parts are delivered into radial orienting chutes rotating about the center of the machine. In the chutes, the parts are all oriented the same way and delivered at the ends of the orienting chutes in a vertical attitude. In the system shown the parts are to be placed into boxes in parallel rows of five side by side parts each, although any number could be used. This is accomplished by arranging the orienting chutes in groups of five or the desired number of side by side parts in each row. The five chutes in the illustrated group are of different radial lengths, so that each chute delivers a part at a different radial distance from the center, than the adjacent chute, the radial spacing between parts corresponding to the spacing between vertical tubes leading to the partitioned boxes. The parts are supported at the ends of the orienting chutes by a stationary plate which covers the loading portion of the arc of rotation traversed by the orienting chutes.

As the orienting rim assembly rotates, the oriented parts are carried over the edge of the supporting plate and to the dropping aperture where they fall into the tubes. As can be seen in FIG. 1, the group of five orienting chutes places a part in each of five vertical accumulator tubes. As the orienting rim continues to rotate, a second group of chutes passes over the edge of the supporting plate and drops another part into each of the five vertical accumulator tubes. Since the orienting chutes cover the entire perimeter of the orienting rim assembly, the parts are continuously discharged into the vertical accumulator tubes. Rates in excess of 2000 parts per minute are obtainable.

The boxes to be filled are advanced longitudinally under the vertical discharge tubes at a speed which will withdraw the parts at approximately the same rate at which they are being deposited into the tube and delivered into the desired side by side array.

Sensors placed within the vertical guidance tubes may determine, if the parts are being stacked up too high and, if so, cause the flow of parts from the orienting rim to be temporarily interrupted.

The parts may be metered out the bottom of the tube one at a time either by the shape of the partitioning within the box or by an escapement mechanism (not illustrated) on each tube.

In FIG. 1 rotating disc 22 delivers randomly disposed parts through apertures 26 in outer baffle 20. Since the parts are to be translated into rows of five each, the radially extending chutes are sequenced in groups of five varying lengths, corresponding to the width of the rows, chutes 28, 30, 32, 34 and 36 sliding over stationary plate 38 and at aperture 40 dropping the parts respectively into a vertical guidance tubes 42, 44, 46, 48 and 50. A level sensor 52 may be placed in the vertical tubes, so as to limit the amount of injecting of parts into the radial chutes. A conventional bulk feeder 24 may be employed to deliver the articles to the rotating rim. A series of boxes 56, having parallel rows 62, 64 of five each may be advanced upon conveyor means 60 moving over supporting apparatus 58 in sequence with the dropping of the containers into the side by side rows.

Figure 2:
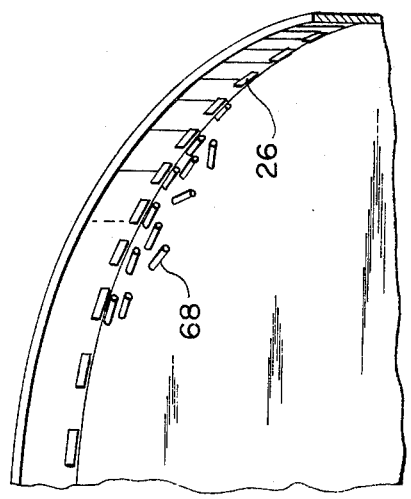
FIG. 2 is a fragmentary perspective, showing articles such as shell casings in random array and at the point of discharge into the radial chutes.

In FIG. 2 articles 68 are shown being injected by centrifugal force into radial chutes via portals 26.

Figure 3:
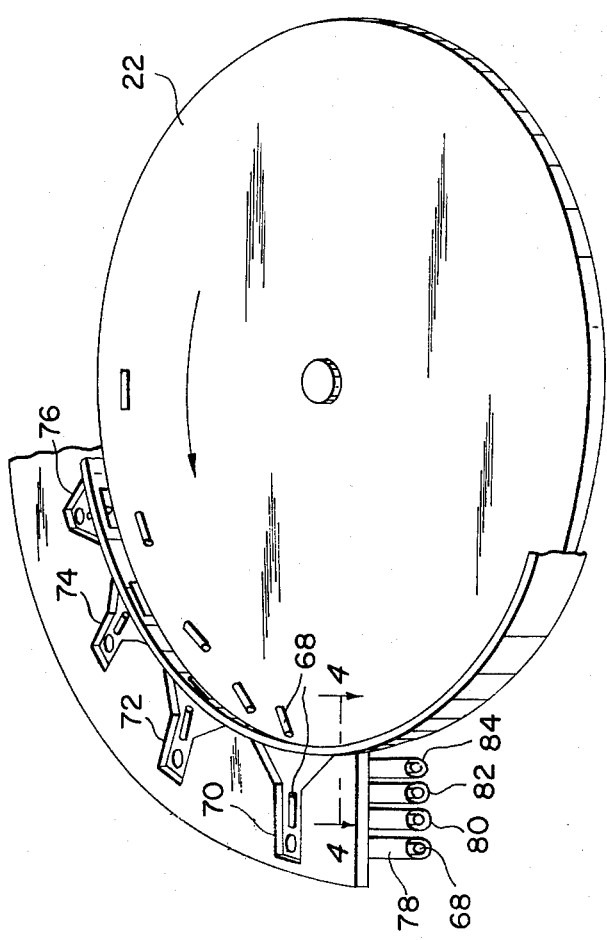
FIG. 3 is a fragmentary top plan of a modified installation involving a radial chutes of four lengths for building a matrix of parallel rows each having four containers in side by side relationship.

In FIG. 3 a modified device is illustrated showing radial chutes 70, 72, 74 and 76 for positioning parts 68 into container pockets 78, 80, 82 and 84.

Figure 4:
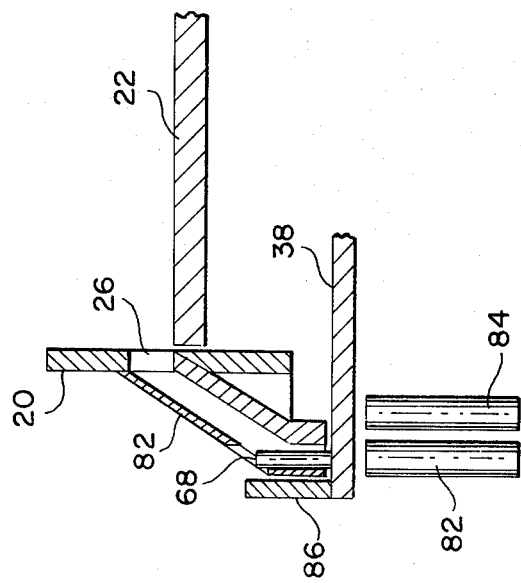
FIG. 4 is a transverse section taken along section line 4—4 of FIG. 3 and showing discharging of the container from the radial chute into the matrix.

This is further illustrated in FIG. 4 part 68 accelerated outwardly and downwardly by centrifugal and gravity force means to the outer end of chute 82 and supported by vertical baffle 86 in sliding relationship with stationary plate 38 prior to dropping or discharge into vertical tube 82.

In FIG. 5 a further modification is shown wherein the parts may be radially distributed through chutes 88 and 90 to superposed stationary plates 92 and 94 for developing parallel side by side rows upon different level matrices.

Figure 7:
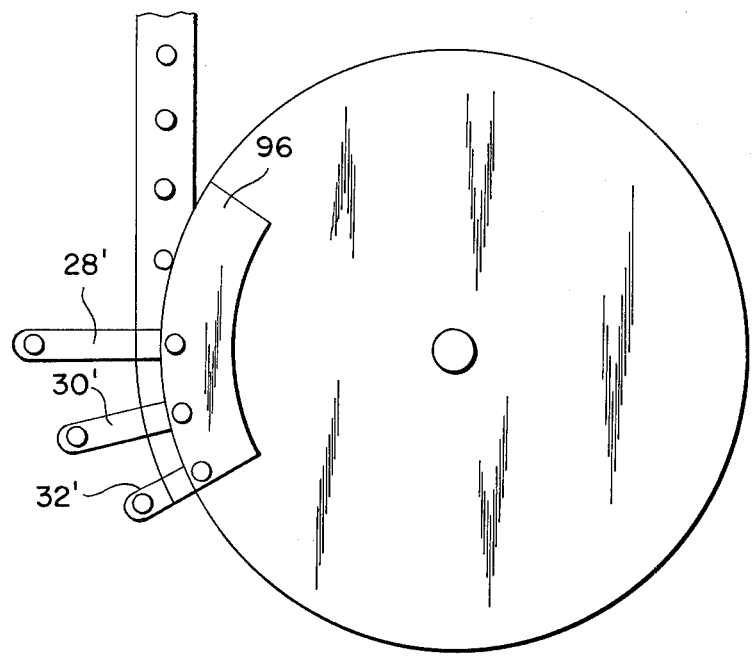
FIG. 7 is a fragmentary top plan of the FIG. 6 species of invention wherein the moving conveyor delivers the article in a single file upon a stationary supporting plate.
Figure 8:
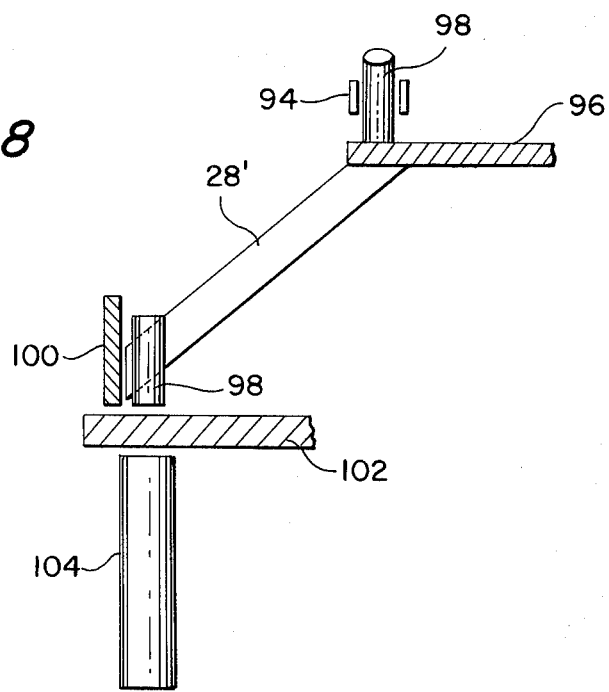
FIG. 8 is a transverse section of the modification, according to FIG. 7.

In FIG. 6 a modification is illustrated wherein parts 98 are advanced in single file by means of chain 94 upon stationary plate 96 from whence they are dropped, as illustrated in FIGS. 7 and 8 into the various length radial chutes. As the articles travel down chute 28', they are kept upright and in rotary moving relationship with stationary plate 102 by means of vertical plate 100 prior to dropping into tube 104.

Figure 9:
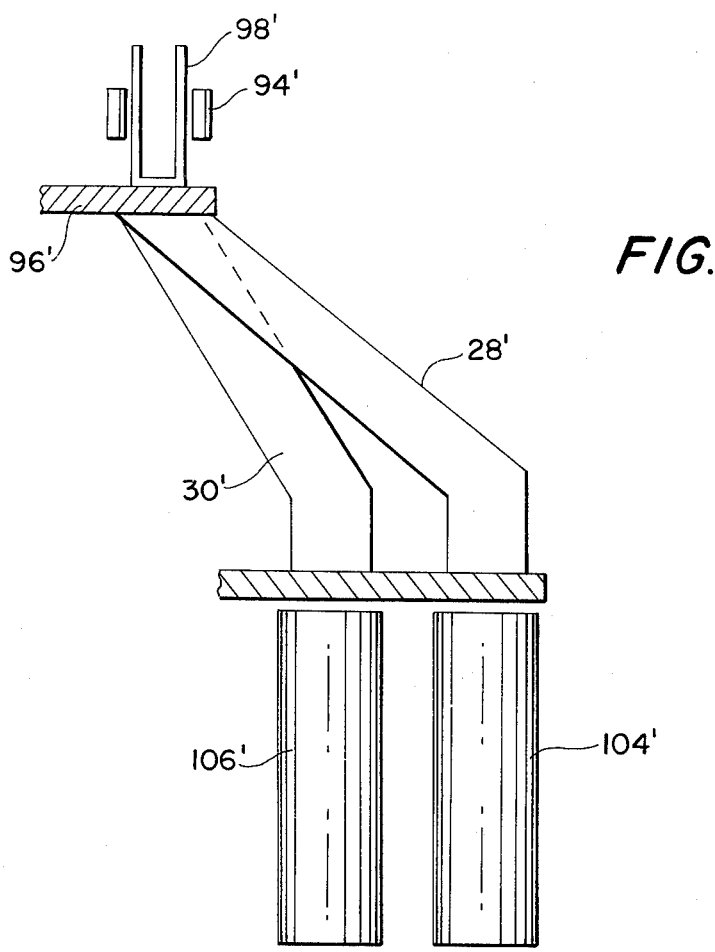
FIG. 9 is a transverse section, showing the positioning of radial chutes with respect to vertical pockets in the matrix.

In FIG. 9 a further modification is shown wherein the various length chutes 28 and 30 lead directly into the vertical chutes 104' and 106'.

Figure 10:
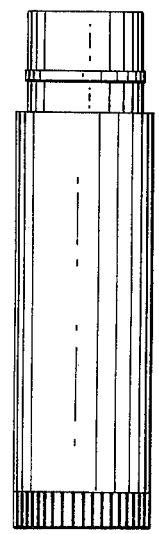
FIG. 10 is a fragmentary perspective of a lip balm container which may be filled, according to the present method.

In FIG. 10 a lip balm container is shown in perspective as illustrative of one type of container which may be delivered into the partitioned boxes 56 of the type illustrated in FIGS. 1 and 6.

Manifestly, various structures may be employed according to the present method and without departing from the spirit of the invention.

We claim:

1. High speed method for translating articles from in-line array to side by side array as a matrix of parallel rows comprising:
   A. advancing said articles upon a horizontal plane;
   B. centrifugally accelerating said articles outwardly to varying radial lengths, according to the desired side by side spacing
   C. supporting said articles at the desired radial length; then,
   D. discharging said articles downwardly into side by side array as a matrix of parallel rows.

2. High speed method for translating articles from in-line array to side by side array as a matrix of parallel rows as in claim 1, wherein said articles are advanced from a rotating inner disc.

3. High speed method for translating articles from in-line array to side by side array as a matrix of parallel rows comprising:
   A. advancing said articles upon a horizontal plane;
   B. discharging said articles into an array of rotating chutes disposed at varying radial lengths;
   C. supporting said articles within said chutes and;
   D. discharging said articles from the outer ends of said chutes and into a side by side array as a matrix of parallel rows.

4. High speed method for translating articles from in-line array to side by side array as in claim 3, including advancing said articles upon a rotating inner ring communicating with said chutes.

5. High speed method for translating articles from in-line array to side by side array as in claim 3, said chutes having their outer ends extending above said matrix.

6. High speed method for translating articles from in-line array to side by side array as in claim 5, wherein adjacent chute ends are superposed one upon the other so as to discharge said articles into superposed matrices of parallel rows.

7. High speed method for translating articles from in-line array to side by side array as in claim 3, including advancing said matrix linearly with respect to said rotating chutes.

8. High speed method for translating articles from in-line array to side by side array as in claim 7, including guiding said articles side by side and vertically downward from the outer ends of said chutes and into said matrix.

9. High speed method for translating articles from in-line array to side by side array as in claim 8, including accumulating a series of articles while guiding between chutes and said matrix.

10. High speed method for translating articles from in-line array to side by side array as in claim 9 including sensing the number of articles thus accumulated and, accordingly, limiting further loading of said articles.

11. High speed method for translating articles from in-line array to side by side array as in claim 3, including radially staggering the ends of said chutes according to the width of said parallel rows.

12. High speed method for translating articles from in-line array to side by side array as in claim 11, including supporting said articles within said chutes upon a stationary plate, apertured at a point above said matrix so as to drop said articles downwardly into said matrix.

13. High speed method for translating articles from in-line array to side by side array as in claim 12, including inclining said chutes downwardly.

14. High speed method for translating articles from in-line array to side by side array as in claim 12, including discharging of said articles vertically upright into said matrix.

15. High speed method for translating articles from in-line array to side by side array as in claim 12, including vertically aligning said articles within said chute prior to discharge into said matrix.

* * * * *